US012569963B2

(12) United States Patent
Kinerk

(10) Patent No.: US 12,569,963 B2
(45) Date of Patent: Mar. 10, 2026

(54) FILTER TOOL AND RELATED METHODS

(71) Applicant: Kinerk Racetech LLC, Cincinnati, OH (US)

(72) Inventor: John-Patrick Kinerk, Cincinnati, OH (US)

(73) Assignee: Kinerk Racetech LLC, Cincinnati, OH (US)

( * ) Notice: Subject to any disclaimer, the term of this patent is extended or adjusted under 35 U.S.C. 154(b) by 0 days.

(21) Appl. No.: 19/017,186

(22) Filed: Jan. 10, 2025

(65) Prior Publication Data

US 2025/0229393 A1 Jul. 17, 2025

Related U.S. Application Data

(60) Provisional application No. 63/620,343, filed on Jan. 12, 2024.

(51) Int. Cl.

| | |
|---|---|
| ***B25B 27/00*** | (2006.01) |
| ***B25B 13/06*** | (2006.01) |
| *B25B 13/48* | (2006.01) |
| *B25B 13/50* | (2006.01) |
| *B25B 21/00* | (2006.01) |

(52) U.S. Cl.

CPC ........ *B25B 27/0042* (2013.01); *B25B 13/065* (2013.01); *B25B 13/06* (2013.01); *B25B 13/481* (2013.01); *B25B 13/5008* (2013.01); *B25B 21/00* (2013.01); *B25B 21/007* (2013.01); *Y10T 29/49824* (2015.01)

(58) Field of Classification Search

CPC ..... B25B 13/06; B25B 13/065; B25B 13/481; B25B 13/5008; B25B 21/007; B25B 27/0042; Y10T 29/49824

See application file for complete search history.

(56) References Cited

U.S. PATENT DOCUMENTS

| | | | | |
|---|---|---|---|---|
| 1,590,200 A * | 6/1926 | McGuckin | B25B 27/0057 74/543 |
| 6,922,887 B1 * | 8/2005 | Keswani | H01R 43/033 29/757 |
| 10,065,298 B1 * | 9/2018 | Winscott | B25B 27/0042 |

(Continued)

FOREIGN PATENT DOCUMENTS

DE 202021103766 U1 * 10/2021 ......... B25B 27/0042

OTHER PUBLICATIONS

Machine Translation for DE 202021103766 U1 (Year: 2021).*

*Primary Examiner* — Jermie E Cozart
(74) *Attorney, Agent, or Firm* — FBT Gibbons LLP

(57) ABSTRACT

A filter tool and method of removing a filter includes a socket head and a plurality of teeth. The socket head has a proximal end portion, a distal end portion, and an outer wall at least partially surrounding a longitudinal axis and defining a hollow configured to receive at least a portion of a housing of the filter. The plurality of teeth are configured to grip the housing of the filter and further define the hollow. The plurality of teeth are angularly positioned about the longitudinal axis and extend radially inward from the outer wall toward the longitudinal axis and further extend longitudinally toward the proximal end portion. The hollow thus narrows toward the proximal end portion for rotatably gripping the housing of the filter received therein and removing the filter from a filter mount.

14 Claims, 4 Drawing Sheets

(56) References Cited

U.S. PATENT DOCUMENTS

2006/0053983 A1* 3/2006 Groetsch ............. B25B 27/0042
81/121.1
2006/0117912 A1* 6/2006 McCalley, Jr. ......... B25B 27/18
81/57.32
2012/0222522 A1* 9/2012 Chen ................... B25B 27/0042
81/57
2021/0107123 A1* 4/2021 Moran ................ B25B 27/0042
2022/0048169 A1* 2/2022 Sands ................. B25B 13/5008
2022/0212322 A1* 7/2022 Owens .................... B25B 13/06

* cited by examiner

FILTER TOOL AND RELATED METHODS

BACKGROUND

Machine maintenance often requires servicing one or more systems of a mechanical device. This service may include, but is not limited to, repairing, cleaning, or replacing one or more features of these systems to increase the useful life of the machine, improve the efficiency of the machine, and generally enhance an operator's overall experience using the machine while the machine is in use. For example, an automotive vehicle undergoes routine maintenance of its lubrication system to extend the useful life of the vehicle. This maintenance typically involves draining used engine oil from the vehicle, removing a used oil filter, replacing the used oil filter with a new oil filter, refilling the engine with new oil, and appropriately disposing of the used filter and used engine oil. While maintenance is often scheduled for a predetermined interval of use, in other instances such maintenance may be unplanned or even unexpected depending on the operator's use and/or operational state of the vehicle.

When possible, engineers typically design a vehicle this service to be performed by a service technician, such as a mechanic, with relatively standardized tools for a given task. For example, engine fasteners selected from metric sizes may be removed relatively easily with common, complementary metric socket wrenches already available to most service technicians. Moreover, these socket wrenches have a particularly convenient size and shape to easily access and grip the fasteners during service.

In contrast, other service work may benefit from more specialized tools, such as filter wrenches for servicing hard-shell filters, including oil filters. In one example, a universal filter wrench configured to grip oil filters of varying size often has band, formed of flexible metal or fabric, that tightens around the oil filter until sufficient friction is generated between the band and the annular, hard-shell housing of the oil filter to enable the service technician to rotate the filter wrench and, in turn, rotate the oil filter for removal. Unfortunately, limited clearance around an oil filter in conjunction with a slippery, oil coated hard-shell housing often frustrates removal of the oil filter thereby increasing the time and cost of the labor to perform the service. In another example, a filter cap wrench specifically sized and shaped to complementary features on an end of an oil filter may be used to engage the oil filter and apply sufficient torque for removal. While less prone to slippage during removal, each filter cap wrench is specifically configured for use with a relatively limited number of oil filters such that a service technician working with many different vehicles may require many expensive and limited use filter cap wrenches, again increasing the cost to perform the service.

There is thus a need for a tool for removing hard-shell housing components, particularly a hard-shell housing filter, that addresses present challenges and characteristics such as those discussed above.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1:
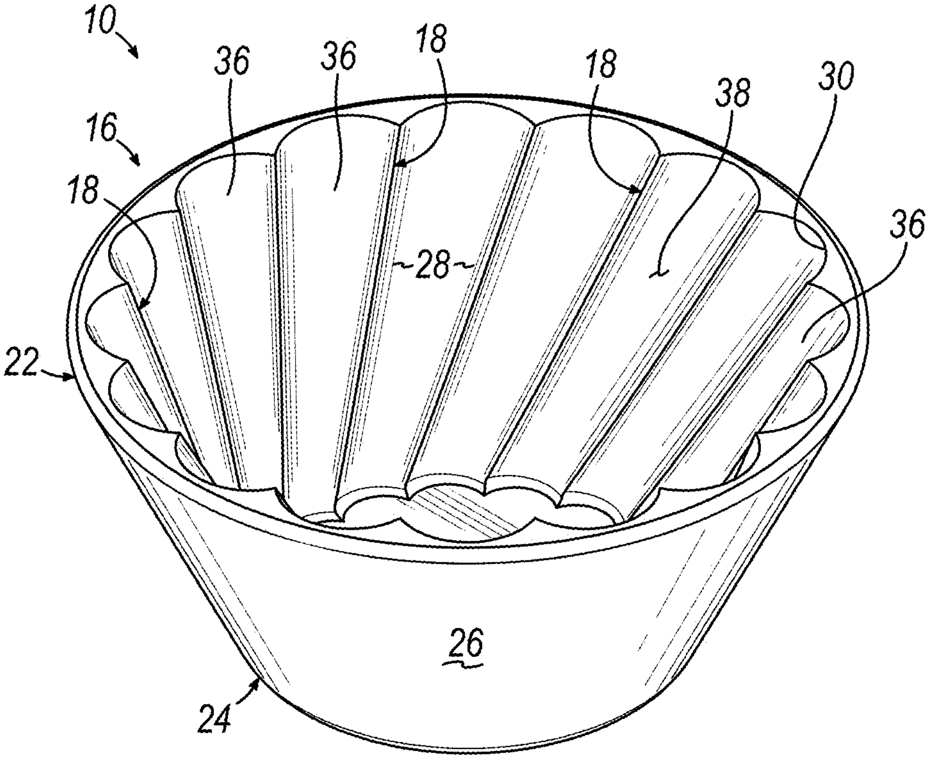
FIG. 1 depicts a distal perspective view of an example of a filter tool including a socket head defining a hollow and a plurality of teeth configured to rotatably grip a hard-shell housing of a mechanical component.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

For clarity of disclosure, the terms "proximal" and "distal" are defined herein relative to a human or robotic operator of the tool assembly with the filter tool extending therefrom. The term "proximal" refers the position of an element closer to the human or robotic operator of the tool assembly and further away from the filter tool of the tool assembly. The term "distal" refers to the position of an element closer to the filter tool of the tool assembly and further away from the human or robotic operator of the tool assembly.

I. Filter Tool

Figure 2:
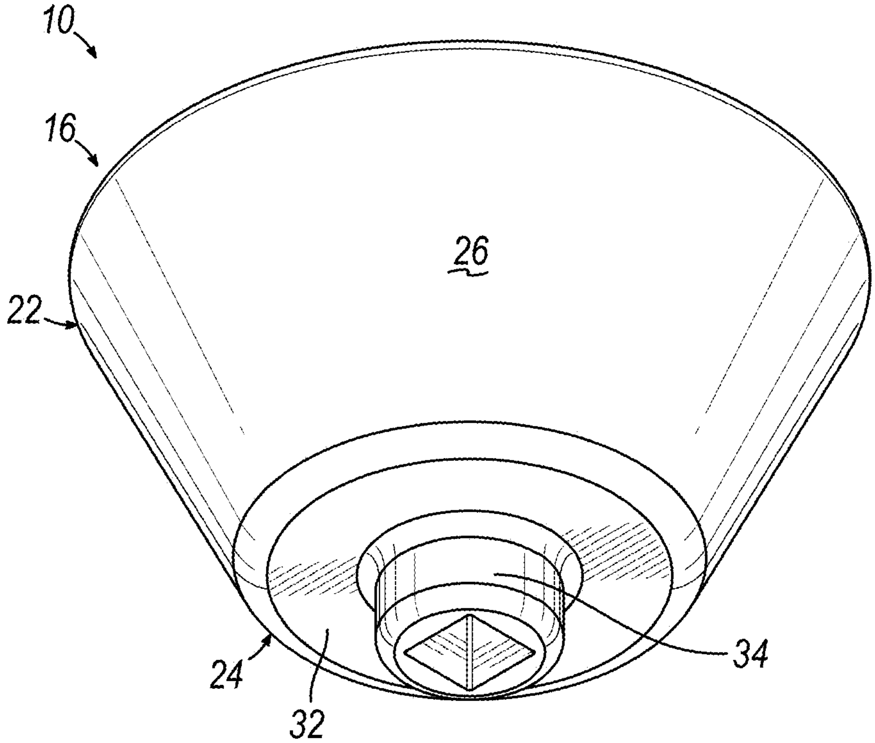
FIG. 2 depicts a proximal perspective view of the filter tool of FIG. 1 including a drive socket proximally extending from the socket head.
Figure 7:
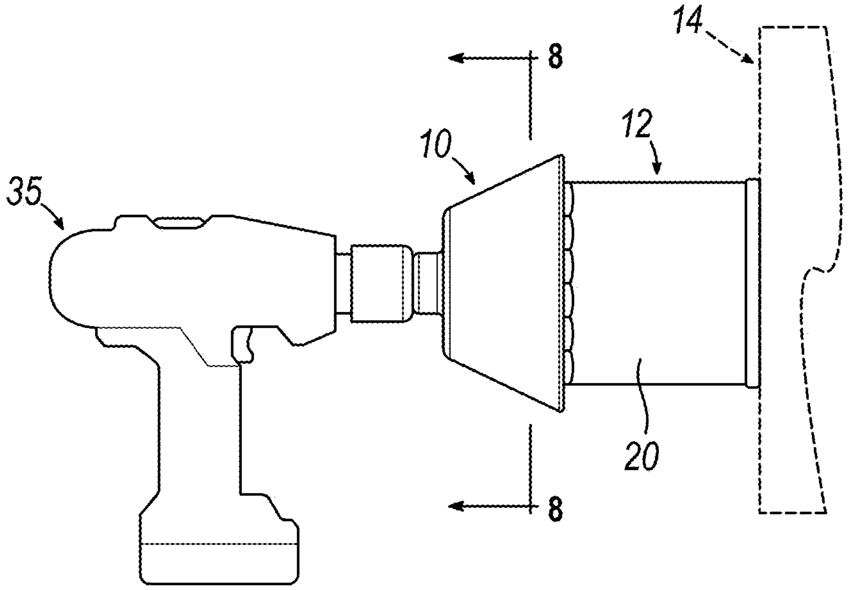
FIG. 7 depicts the tool assembly of FIG. 6 with the oil filter received within the filter tool for removal from a filter mount.

FIGS. 1-2 show an example of a filter tool (10) configured to remove an oil filter (12) (see FIG. 7) from a filter mount (14) (see FIG. 7). Filter tool (10) includes a socket head (16) and a plurality of teeth (18) configured to grip a hard-shell housing (20) (see FIG. 7) of oil filter (12) (see FIG. 7) as discussed below in additional detail. Socket head (16) extends along a longitudinal axis (21) (see FIG. 3) and more particularly has a distal end portion (22), a proximal end portion (24), and an outer wall (26). Outer wall (26) extends from the distal end portion (22) to the proximal end portion (24) and, in the present example, surrounds longitudinal axis (21) defining a hollow similarly surrounding longitudinal axis (21). Hollow (28) is configured to receive hard-shell housing (20) (see FIG. 7) for engagement with teeth (18). In this respect, teeth (18) further define hollow (28) and are angularly positioned about longitudinal axis (21). Hollow (28) narrows toward proximal end portion (24) in order to accommodate oil filters of various diameters so long as such oil filters are small enough to be inserted into a distal opening (30) of distal end portion (22), but large enough to be received against teeth (18) within hollow (28). Each exemplary tooth (18) extends radially inward from outer wall (26) toward longitudinal axis (21) and further extends longitudinally toward proximal end portion (24) while narrowing closer together such that urging teeth (18) against hard-shell housing (20) (see FIG. 7) rotatably grips hard-shell housing (20) (see FIG. 7) for removal. While the present example of filter tool (10) specifically discusses use with a filter, such as oil filter (12) (see FIG. 7), tool (10) may be used to rotatably grip other rigid structures, such as housings. The invention is thus not intended to be unnecessarily limited to use with filters, particularly oil filters.

Figure 3:
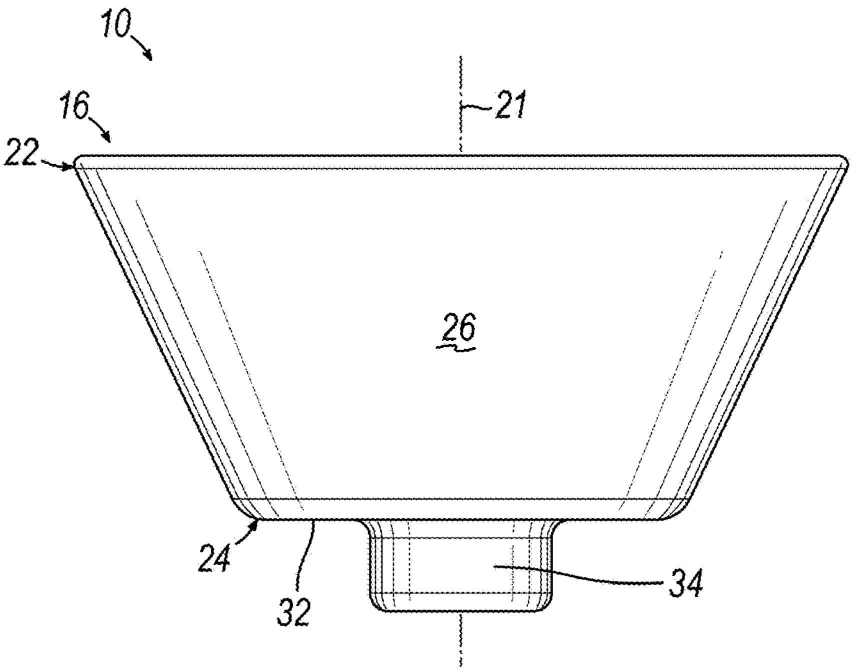
FIG. 3 depicts a side elevational view of the filter tool of FIG. 1.

With respect to FIGS. 2 and 3, filter tool (10) further includes a proximal wall (32) transversely extending relative to longitudinal axis (21) such that outer wall (26) distally extends therefrom. In contrast, a drive socket (34) of filter tool (10) proximally extends from proximal wall (32) and is configured to releasably connect to a drive tool (35), such as a power drill (35) (see FIG. 6), for rotatably driving filter tool (10). Such drive tool (35) may be electrically powered or may be a lever arm, such as a hand-held ratchet wrench, for manually directing rotation of filter tool (10). While drive socket (34) is configured to releasably connect to a tool, in another example, filter tool (10) may be fixed to a tool such that the invention is not intended to be unnecessarily limited to being removable from a tool for rotatably driving filter tool (10). Alternatively, in another example, a user may grip filter tool (10) directly by hand for driving rotation of filter tool (10). Filter tool (10) is thus not intended to be unnecessarily limited to being driven by drive tool (35) as shown in the present example.

Figure 4:
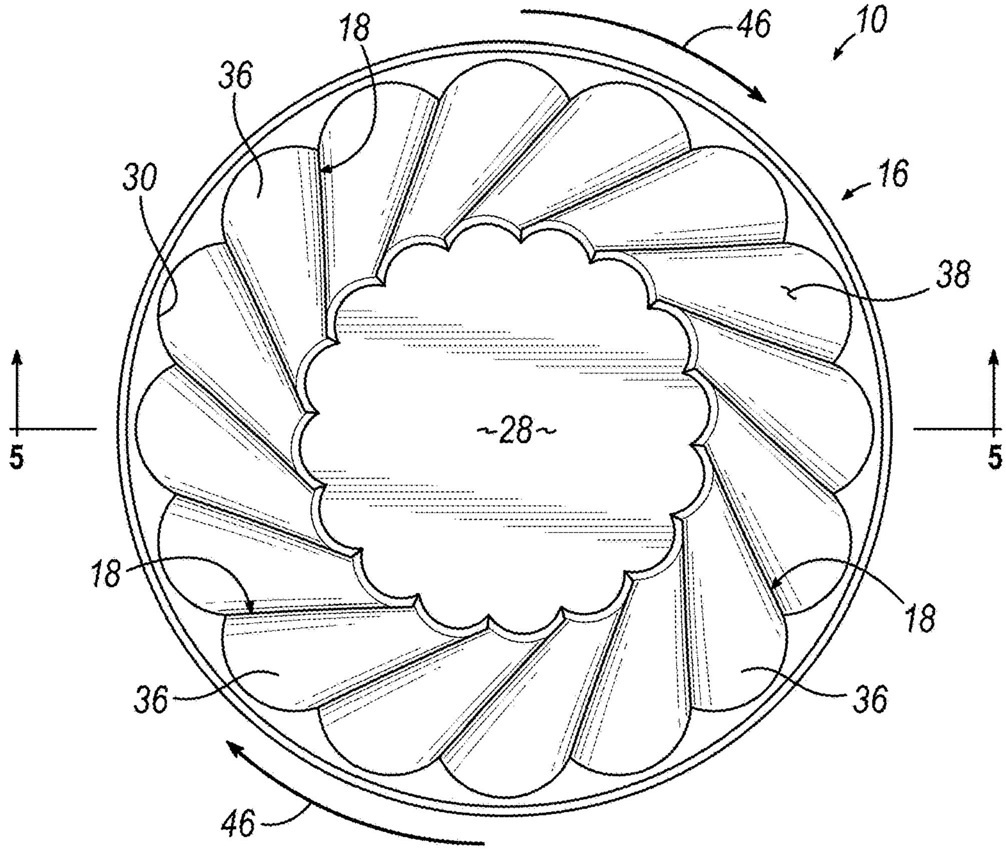
FIG. 4 depicts a distal end view of the filter tool of FIG. 1.

Each of outer wall (26) and hollow (28) shown in FIGS. 3 and 4 of the present example is frustoconical in shape such that distal end portion (22) has a larger diameter, whereas proximal end portion (24) has a relatively smaller diameter. In this respect, distal end portion (22) tapers down and narrows to proximal end portion (24). Of course, an outer surface of outer wall (26) may be alternatively shaped in other examples, such as by having a more cylindrical side profile. The invention is thus not intended to be unnecessarily limited to outer wall (26) of the present example.

Figure 5:
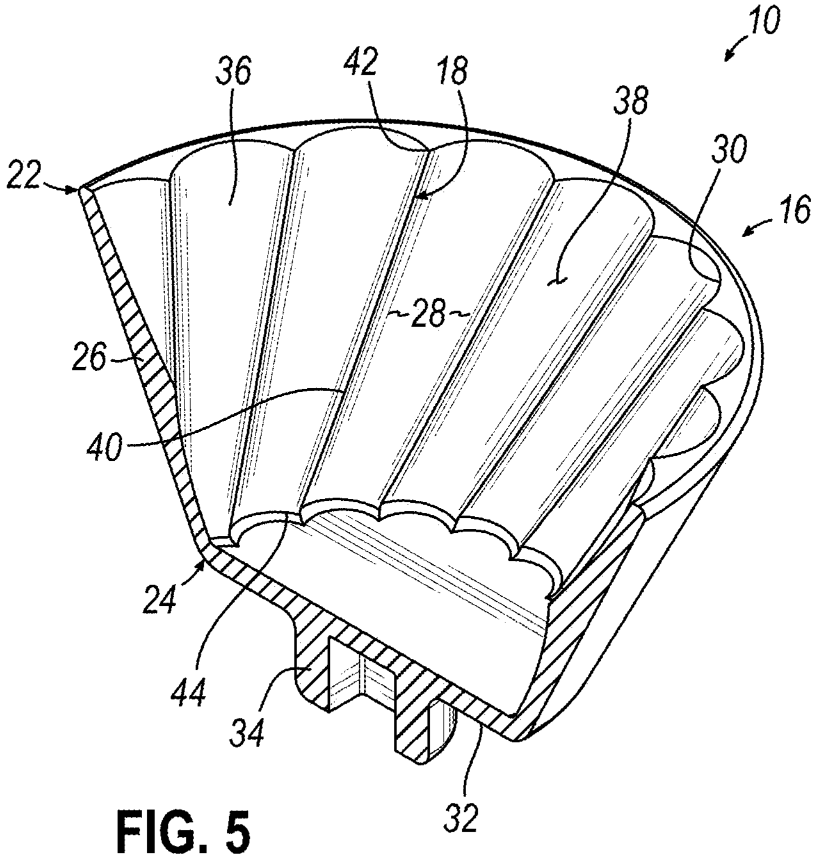
FIG. 5 depicts a sectional perspective view of the filter tool of FIG. 1 taken along section line 5-5 of FIG. 4.

FIGS. 3-5 show teeth (18) angularly surrounding longitudinal axis (21) in greater detail. To this end, filter tool (10) of the present example also includes a plurality of flutes (36) respectively positioned between pairs of teeth (18) so as to be defined by teeth (18) and outer wall (26) in the present example. Flutes (36) and teeth (18) thus alternate angularly about longitudinal axis (21) thereby collectively defining inner serrated surface (38) surrounding longitudinal axis (21) that is configured to engage and annularly deform hard-shell housing (20) (see FIG. 7) of oil filter (12) (see FIG. 7) when distally compressed thereagainst as discussed below in greater detail. Given that inner serrated surface (38) is frustoconical in shape with hollow (28), each flute (36) of the present example narrows in the proximal direction between adjacent tooth edges (40) of teeth (18), which are relatively sharp in the present example. Also in the present example, each flute (36) is concave about longitudinal axis (21) and is generally like each other flute (36). However, flutes (36) may vary in size and shape in an alternative example such that the invention is not intended to be unnecessarily limited to flutes (36) as shown in the present example. In addition, filter tool (10), specifically socket head (16) and teeth (18), is singularly and unitarily formed in the present example, but is not intended to be unnecessarily limited to such singular construction.

As briefly discussed above, each tooth (18) has tooth edge (40) configured to engage with and deform hard-shell housing (20) (see FIG. 7) of oil filter (12) (see FIG. 7). Each tooth (18) more particularly has a distal tooth end (42) and a proximal tooth end (44) with tooth edge (40) longitudinally extending therebetween. Notably, inner serrated surface (38) with teeth (18) is configured to remove oil filter (12) (see FIG. 7) upon engaging and rotating oil filter (12) (see FIG. 7) in a removal rotational direction (46), which in the present example is threaded with a traditional right-hand thread. As such, when viewed from a more proximal position of a user behind power drill (35) (see FIG. 7), counterclockwise rotation applied to oil filter (12) (see FIG. 7) loosens oil filter (12) from filter mount (14) (see FIG. 7) rather than tightening oil filter (12) (see FIG. 7) against filter mount (14) (see FIG. 7). In another example, oil filter (12) may be threaded with a left-hand thread, which would reverse removal rotational direction (46) to a clockwise rotation applied to oil filter (12) (see FIG. 7). In this respect, the term "removal rotational direction" may be either one of counterclockwise rotation or clockwise rotation depending on whether filter tool (10) is respectively right-hand or left-hand threaded. The term "removal rotational direction" thus applies to the particular rotational direction that removes oil filter (12) (see FIG. 7) and is not intended to be unnecessarily limited to counterclockwise or clockwise rotation when viewed from the same reference position.

To this end, distal tooth end (42) of each tooth (18) is angularly clocked forward in removal rotational direction (46) relative to proximal tooth end (44) with tooth edge (40) extending between distal tooth end (42) and proximal tooth end (44) of respective teeth (18). Tooth edge (40) of the present example thus angularly tapers opposite of removal rotational direction (46) from each distal tooth end (42) to each proximal tooth end (44) in order to effectively engage with and deform hard-shell housing (20) (see FIG. 7) of oil filter (12) (see FIG. 7) during use. More particularly, in the present example, each tooth edge (40) extends along a relatively linear path. However, alterative edges of teeth may extend along alternative shaped paths in other examples such that the invention is not intended to be unnecessarily limited to the particular tooth edge (40) shown in the present example. Furthermore, in one example, inner serrated surface (38) is defined by sixteen flutes (36) and sixteen teeth (18) that alternate about longitudinal axis (21). Another example of inner serrated surface (38) may have less than sixteen such flutes (36) and teeth (18), whereas another example may have more than sixteen such flutes (36) and teeth (18). The invention is thus not intended to be unnecessarily limited to the particular numbers of flutes (36) and teeth (18) shown in the present example.

II. Tool Assembly with Filter Tool for Filter Removal

Figure 6:
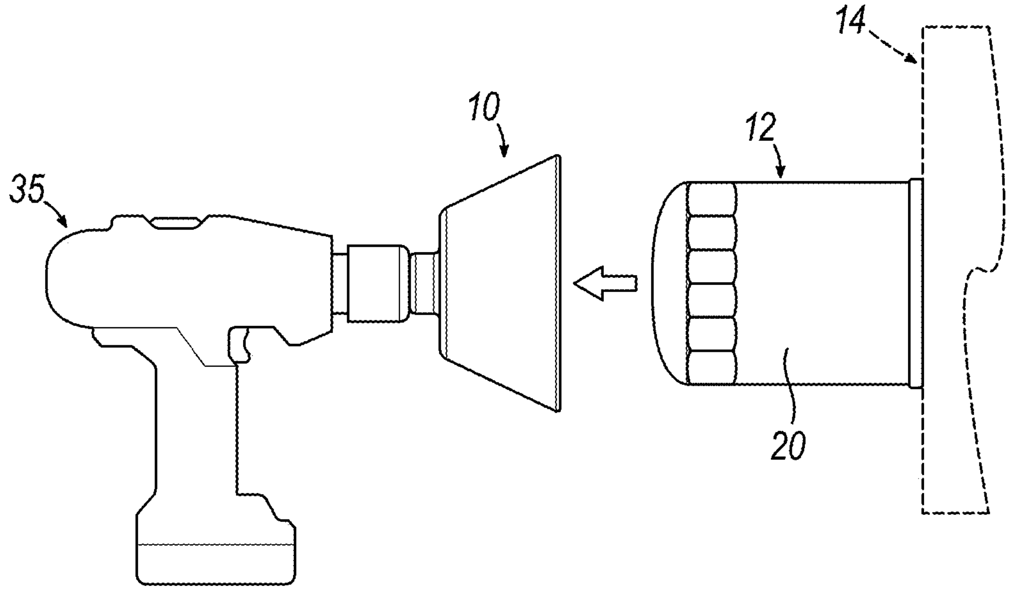
FIG. 6 depicts a tool assembly including the filter tool of FIG. 1 receiving an oil filter.
Figure 8:
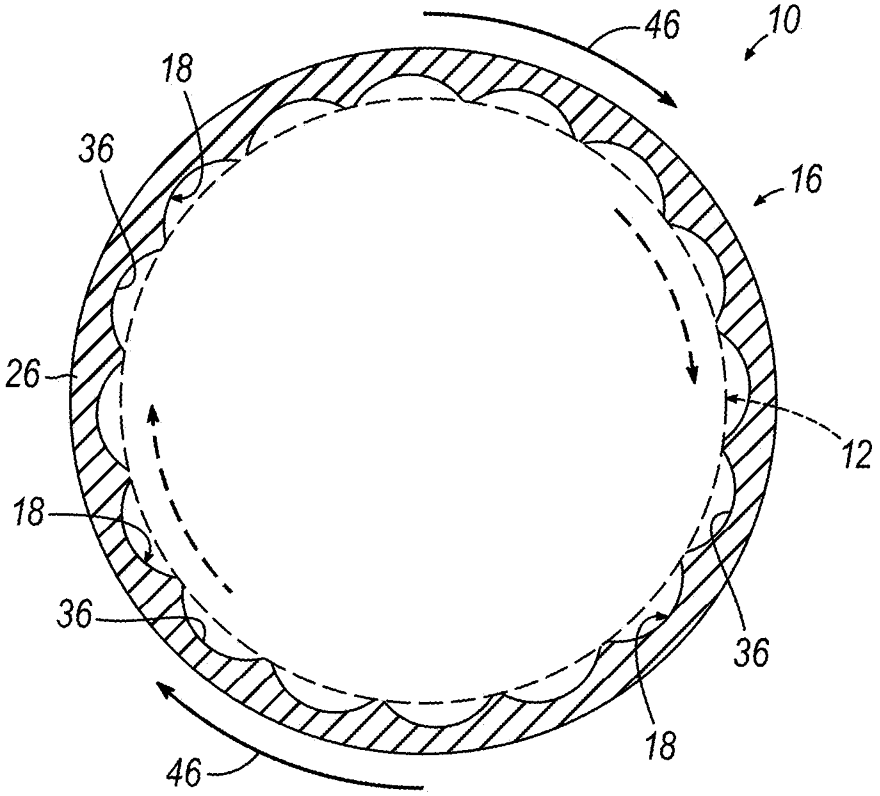
FIG. 8 depicts an enlarged cross-sectional view of the filter tool rotatably gripping the oil filter of FIG. 7 taken along section line 8-8 of FIG. 7.

In use, with respect to FIGS. 6-8, filter tool (10) of the present example is removably attached to power drill (35) and longitudinally urged against oil filter (12), which has been tightened against filter mount (14) discussed briefly above. FIGS. 6 and 7 more particularly show hollow (28) of filter tool (10) receiving an end portion of hard-shell housing (20) such that hard-shell housing (20) contacts teeth (18). In one example, at least some deformation of hard-shell housing (20) may already occur as the user distally urges teeth (18) against hard-shell housing (20) via power drill (35). As used herein, the term "deform" means any change in shape to hard-shell housing (20) and may include, but is not limited to, plastic deformation, resilient deformation, cracking, and/or puncturing of hard-shell housing (20).

As user applies distal force, the user simultaneously directs power drill (35) to rotate socket head (16) in removal rotational direction (46) as shown in FIG. 8. In turn, teeth engage with and deform hard-shell housing (20) while flutes accommodate adjoining portions of hard-shell housing (20) being received radially therein. Teeth (18) thereby grip hard-shell housing (20), applying torque to hard-shell housing (20) in removal rotational direction (46). Eventually, as deformation begins to decrease, torque applied between oil filter (12) and filter mount (14) begins to increase. Applied torque may increase until the applied torque overcomes the engagement between oil filter (12) and filter mount (14) such that oil filter (12) breaks free of filter mount (14) for further removal by power drill (35) or by hand.

III. Illustrative Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventor(s) or by a successor in interest to the inventor(s). If any claims are presented in this application or in subsequent filings related to this application that include additional features beyond those referred to below, those additional features shall not be presumed to have been added for any reason relating to patentability.

Example 1

A tool for removal of a mechanical component, comprising: (a) a socket head distally extending along a longitudinal axis, including: (i) a distal end portion having a distal opening configured to receive a housing of a mechanical component, (ii) a proximal end portion, (iii) an outer wall at least partially surrounding the longitudinal axis and extending from the distal end portion toward the proximal end portion, wherein the outer wall defines a hollow configured to receive at least a portion of the housing of the mechanical component therein; and (b) a plurality of teeth configured to grip the housing of the mechanical component, wherein the plurality of teeth further define the hollow and are angularly positioned about the longitudinal axis, wherein each of the plurality of teeth extends radially inward from the outer wall toward the longitudinal axis and further extends longitudinally toward the proximal end portion such that the hollow narrows toward the proximal end portion for rotatably gripping the housing of the mechanical component received therein.

Example 2

The tool of Example 1, wherein each of the plurality of teeth includes a distal tooth end, a proximal tooth end, and a tooth edge longitudinally extending therebetween, wherein the tooth edge is configured to engage the housing of the mechanical component.

Example 3

The tool of Example 2, wherein the distal tooth end is angularly offset from the proximal tooth end.

Example 4

The tool of Example 2, wherein the plurality of teeth is configured to grip the housing of the mechanical component while rotating the socket head in a first rotational direction about the longitudinal axis.

Example 5

The tool of Example 4, wherein the distal tooth end is angularly offset from the proximal tooth end such that the tooth edge angularly extends in the second direction from the distal tooth end to the proximal tooth end.

Example 6

The tool of any one or more of Examples 1 through 5, further comprising a plurality of flutes extending radially outward into the outer wall away from the longitudinal axis, and wherein the plurality of flutes extends longitudinally toward the proximal end portion such that the hollow narrows toward the proximal end portion.

Example 7

The tool of Example 6, wherein each of the plurality of flutes is concave.

Example 8

The tool of any one or more of Examples 6 through 7, wherein each of the plurality of flutes narrows in the proximal direction.

Example 9

The tool of any one or more of Examples 6 through 8, wherein the plurality of flutes and the plurality of teeth collectively define a serrated surface surrounding the longitudinal axis.

Example 10

The tool of any one or more of Examples 1 through 9, wherein the hollow is frustoconical.

Example 11

The tool of any one or more of Examples 1 through 10, wherein the outer wall is frustoconical.

Example 12

The tool of any one or more of Examples 1 through 11, further comprising a drive socket projecting proximally from the socket head.

Example 13

The tool of Example 12, wherein the drive socket and the socket head are not in fluid communication.

Example 14

The tool of any one or more of Examples 1 through 13, wherein the socket head and the plurality of teeth are singularly and unitarily formed.

Example 15

The tool of any one or more of Examples 1 through 14, wherein the plurality of teeth is equiangularly positioned about the longitudinal axis.

Example 16

The tool of any one or more of Examples 1 through 15, wherein the proximal end portion includes a proximal wall, and wherein the hollow distally extends from the proximal wall to the distal opening.

Example 17

The tool of any one or more of Examples 1 through 16, wherein the hollow extends from the proximal end portion to the distal end portion, wherein the hollow in the proximal end portion has a proximal radius about the longitudinal axis, wherein the hollow in the distal end portion has a distal radius about the longitudinal axis, and wherein the proximal radius is smaller than the distal radius.

Example 18

A tool for removal of a mechanical component, comprising: (a) a socket head distally extending along a longitudinal axis, including: (i) a distal end portion having a distal opening configured to receive a housing of the mechanical component, (ii) a proximal end portion, (iii) an outer wall at least partially surrounding the longitudinal axis and extending from the distal end portion toward the proximal end portion, wherein the outer wall defines a hollow configured to receive at least a portion of the housing of the mechanical component therein; (b) a plurality of flutes extending radially outward into the outer wall away from the longitudinal axis, and wherein the plurality of flutes extends longitudinally toward the proximal end portion such that the hollow narrows toward the proximal end portion; and (c) a plurality of teeth configured to grip the housing of the mechanical component, wherein the plurality of teeth further define the hollow and are angularly positioned about the longitudinal axis, wherein each of the plurality of teeth extends radially inward from the outer wall toward the longitudinal axis and further extends longitudinally toward the proximal end portion such that the hollow narrows toward the proximal end portion for rotatably gripping the housing of the mechanical component received therein, wherein the plurality of flutes and the plurality of teeth collectively define a serrated surface surrounding the longitudinal axis.

Example 19

The tool of Example 18, wherein each of the plurality of teeth includes a distal tooth end, a proximal tooth end, and a tooth edge longitudinally extending therebetween, wherein the tooth edge is configured to engage the housing of the mechanical component, wherein the plurality of teeth is configured to grip the housing of the mechanical component while rotating the socket head in a first rotational direction about the longitudinal axis, and wherein distal tooth end is angularly offset from the proximal tooth end such that the tooth edge angularly extends in the second direction from the distal tooth end to the proximal tooth end.

Example 20

A method of removing a mechanical component from a mount with a tool, the tool including (a) a socket head distally extending along a longitudinal axis, including: (i) a distal end portion having a distal opening configured to receive a housing of the mechanical component, (ii) a proximal end portion, (iii) an outer wall at least partially surrounding the longitudinal axis and extending from the distal end portion toward the proximal end portion, wherein the outer wall defines a hollow configured to receive at least a portion of the housing of the mechanical component therein; and (b) a plurality of teeth configured to grip the housing of the mechanical component, wherein the plurality of teeth further define the hollow and are angularly positioned about the longitudinal axis, wherein each of the plurality of teeth extends radially inward from the outer wall toward the longitudinal axis and further extends longitudinally toward the proximal end portion such that the hollow narrows toward the proximal end portion for rotatably gripping the housing of the mechanical component received therein, the method comprising: (a) longitudinally urging the plurality of teeth against the housing of the mechanical component; and (b) rotating the socket head thereby deforming the housing of the mechanical component and simultaneously rotating housing of the mechanical component to remove the mechanical component from the mount.

IV. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other.

Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A tool for removal of a mechanical component, comprising:

(a) a socket head distally extending along a longitudinal axis, including:

(i) a distal end portion having a distal opening configured to receive a housing of the mechanical component, (ii) a proximal end portion, (iii) an outer wall at least partially surrounding the longitudinal axis and extending from the distal end portion toward the proximal end portion, wherein the outer wall defines a hollow configured to receive at least a portion of the housing of the mechanical component therein; and (b) a plurality of teeth configured to grip the housing of the mechanical component, wherein the plurality of teeth further define the hollow and are angularly positioned about the longitudinal axis, wherein each of the plurality of teeth extends radially inward from the outer wall toward the longitudinal axis and further extends longitudinally toward the proximal end portion such that the hollow narrows toward the proximal end portion for rotatably gripping the housing of the mechanical component received therein, wherein each of the plurality of teeth includes a distal tooth end, a proximal tooth end, and a tooth edge longitudinally extending therebetween, wherein the tooth edge is configured to engage the housing of the mechanical component, wherein the distal tooth end is angularly offset from the proximal tooth end such that the distal tooth end is angularly clocked forward in a first rotational direction about the longitudinal axis relative to the proximal tooth end and the tooth edge angularly tapers in a second rotational direction opposite the first rotational direction from the distal tooth end to the proximal tooth end for engaging the mechanical component during use.

2. The tool of claim 1, further comprising a plurality of flutes extending radially outward into the outer wall away from the longitudinal axis, and wherein the plurality of flutes extends longitudinally toward the proximal end portion such that the hollow narrows toward the proximal end portion.

3. The tool of claim 2, wherein each of the plurality of flutes is concave.

4. The tool of claim 3, wherein each of the plurality of flutes narrows in a proximal direction.

5. The tool of claim 2, wherein the plurality of flutes and the plurality of teeth collectively define a serrated surface surrounding the longitudinal axis.

6. The tool of claim 1, wherein the hollow is frustoconical.

7. The tool of claim 1, wherein the outer wall is frustoconical.

8. The tool of claim 1, further comprising a drive socket projecting proximally from the socket head.

9. The tool of claim 1, wherein the socket head and the plurality of teeth are singularly and unitarily formed.

10. The tool of claim 1, wherein the plurality of teeth is equiangularly positioned about the longitudinal axis.

11. The tool of claim 1, wherein the proximal end portion includes a proximal wall, and wherein the hollow distally extends from the proximal wall to the distal opening.

12. The tool of claim 1, wherein the hollow extends from the proximal end portion to the distal end portion, wherein the hollow in the proximal end portion has a proximal radius about the longitudinal axis, wherein the hollow in the distal end portion has a distal radius about the longitudinal axis, and wherein the proximal radius is smaller than the distal radius.

13. A tool for removal of a mechanical component, comprising:

(a) a socket head distally extending along a longitudinal axis, including:

(i) a distal end portion having a distal opening configured to receive a housing of the mechanical component, (ii) a proximal end portion, (iii) an outer wall at least partially surrounding the longitudinal axis and extending from the distal end portion toward the proximal end portion, wherein the outer wall defines a hollow configured to receive at least a portion of the housing of the mechanical component therein;

(b) a plurality of flutes extending radially outward into the outer wall away from the longitudinal axis, and wherein the plurality of flutes extends longitudinally toward the proximal end portion such that the hollow narrows toward the proximal end portion; and (c) a plurality of teeth configured to grip the housing of the mechanical component, wherein the plurality of teeth further define the hollow and are angularly positioned about the longitudinal axis, wherein each of the plurality of teeth extends radially inward from the outer wall toward the longitudinal axis and further extends longitudinally toward the proximal end portion such that the hollow narrows toward the proximal end portion for rotatably gripping the housing of the mechanical component received therein, wherein the plurality of flutes and the plurality of teeth collectively define a serrated surface surrounding the longitudinal axis, wherein each of the plurality of teeth includes a distal tooth end, a proximal tooth end, and a tooth edge longitudinally extending therebetween, wherein the tooth edge is configured to engage the housing of the mechanical component, wherein the distal tooth end is angularly offset from the proximal tooth end such that the distal tooth end is angularly clocked forward in a first rotational direction about the longitudinal axis relative to the proximal tooth end and the tooth edge angularly tapers in a second rotational direction opposite the first rotational direction from the distal tooth end to the proximal tooth end for engaging the mechanical component during use.

14. A method of removing a mechanical component from a mount with a tool, the tool including (a) a socket head distally extending along a longitudinal axis, including: (i) a distal end portion having a distal opening configured to receive a housing of the mechanical component, (ii) a proximal end portion, (iii) an outer wall at least partially surrounding the longitudinal axis and extending from the distal end portion toward the proximal end portion, wherein the outer wall defines a hollow configured to receive at least a portion of the housing of the mechanical component therein; and (b) a plurality of teeth configured to grip the housing of the mechanical component, wherein the plurality of teeth further define the hollow and are angularly positioned about the longitudinal axis, wherein each of the plurality of teeth extends radially inward from the outer wall toward the longitudinal axis and further extends longitudinally toward the proximal end portion such that the hollow narrows toward the proximal end portion for rotatably gripping the housing of the mechanical component received therein, wherein each of the plurality of teeth includes a distal tooth end, a proximal tooth end, and a tooth edge longitudinally extending therebetween, wherein the tooth edge is configured to engage the housing of the mechanical component, wherein the distal tooth end is angularly offset from the proximal tooth end such that the distal tooth end is angularly clocked forward in a first rotational direction about the longitudinal axis relative to the proximal tooth end and the tooth edge angularly tapers in a second rotational direction opposite the first rotational direction from the distal tooth end to the proximal tooth end, the method comprising:

(a) longitudinally urging the plurality of teeth against the housing of the mechanical component; and (b) rotating the socket head thereby deforming the housing of the mechanical component and simultaneously rotating housing of the mechanical component to grip the mechanical component with the tooth edge and remove the mechanical component from the mount.

* * * * *